United States Patent
Iyoda et al.

(10) Patent No.: US 9,649,976 B2
(45) Date of Patent: May 16, 2017

(54) VEHICLE LAMP

(71) Applicant: Koito Manufacturing Co., Ltd., Tokyo (JP)

(72) Inventors: Haruhiko Iyoda, Shizuoka (JP); Masaya Shido, Shizuoka (JP); Yoshiro Ito, Shizuoka (JP); Toru Ito, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 15/072,438

(22) Filed: Mar. 17, 2016

(65) Prior Publication Data

US 2016/0288702 A1 Oct. 6, 2016

(30) Foreign Application Priority Data

Apr. 3, 2015 (JP) ................................. 2015-076857

(51) Int. Cl.
| | |
|---|---|
| *B60Q 1/44* | (2006.01) |
| *H05B 33/12* | (2006.01) |
| *B60Q 1/26* | (2006.01) |
| *F21S 8/10* | (2006.01) |
| *H05B 33/08* | (2006.01) |

(52) U.S. Cl.
CPC ............. *B60Q 1/44* (2013.01); *B60Q 1/2607* (2013.01); *F21S 48/217* (2013.01); *H05B 33/0845* (2013.01); *H05B 33/0854* (2013.01); *H05B 33/0896* (2013.01); *H05B 33/12* (2013.01)

(58) Field of Classification Search
CPC ........ B60Q 2400/10; B60Q 1/26; B60Q 1/44; B60Q 1/2603; B60Q 1/2607; F21S 48/20; F21S 48/217
See application file for complete search history.

(56) References Cited

U.S. PATENT DOCUMENTS

| | | | |
|---|---|---|---|
| 2004/0179368 A1* | 9/2004 | Takeda ................. | F21S 48/1159 362/466 |
| 2009/0303705 A1* | 12/2009 | Waumans ................ | F21S 8/04 362/228 |
| 2012/0075880 A1* | 3/2012 | Hayashi ............... | F21S 48/1109 362/547 |
| 2012/0170296 A1* | 7/2012 | Ostrowski .......... | F21S 48/2218 362/519 |
| 2015/0015143 A1* | 1/2015 | Inada ................. | H05B 33/0815 315/77 |
| 2015/0016136 A1* | 1/2015 | Nakano ................ | F21S 48/212 362/520 |

FOREIGN PATENT DOCUMENTS

| | | | | |
|---|---|---|---|---|
| DE | WO 2011107904 A1 | * | 9/2011 | .......... F21S 48/1163 |
| GB | 2405755 A | * | 3/2005 | ........... B60Q 1/2696 |
| JP | 2010-205714 A | | 9/2010 | |

* cited by examiner

*Primary Examiner* — Douglas W Owens
*Assistant Examiner* — Pedro C Fernandez
(74) *Attorney, Agent, or Firm* — Abelman, Frayne & Schwab

(57) ABSTRACT

Provided is a vehicle lamp that includes a first light emission unit and a second light emission unit including an organic EL element as a light source. The second light emission unit is turned on at a tail lamp on time. Both the first light emission unit and the second light emission unit are turned on at a stop lamp on time. The vehicle lamp further includes a light reduction unit configured to make light intensity of the second light emission unit at the stop lamp on time become lower than that at the tail lamp on time.

10 Claims, 8 Drawing Sheets

(a) STOP LAMP ON TIME  (b) TAIL LAMP ON TIME

FIG.7

|  |  | LIGHT INTENSITY RATIO OF SECOND LIGHT EMISSION UNIT | |
|---|---|---|---|
|  |  | TAIL LAMP SIGNAL | |
|  |  | OFF (IN DAYTIME) | ON (AT NIGHT) |
| STOP LAMP SIGNAL | OFF (FIRST LIGHT EMISSION UNIT OFF) | TURNED OFF | 100% |
|  | ON (FIRST LIGHT EMISSION UNIT ON) | 20% | 55% (10%) |

NORMAL TIME

FIG.8

|  |  | LIGHT INTENSITY RATIO OF SECOND LIGHT EMISSION UNIT | |
|---|---|---|---|
|  |  | TAIL LAMP SIGNAL | |
|  |  | OFF (IN DAYTIME) | ON (AT NIGHT) |
| STOP LAMP SIGNAL | OFF (FIRST LIGHT EMISSION UNIT OFF) | TURNED OFF | 50 ~ 100% |
|  | ON (FIRST LIGHT EMISSION UNIT ON) | 20% | 55% (10%) |

WHEN TEMPERATURE IS HIGH

| ESTIMATED TEMPERATURE OF ORGANIC EL | LIGHT INTENSITY RATIO |
|---|---|
| ~ 50°C | 100% |
| 50 ~ 60°C | 83% |
| 60 ~ 70°C | 67% |
| 70°C ~ | 50% |

VEHICLE LAMP

CROSS-REFERENCE TO RELATED APPLICATIONS

This application is based on and claims priority from Japanese Patent Application No. 2015-076857, filed on Apr. 3, 2015, with the Japan Patent Office, the disclosure of which is incorporated herein in its entirety by reference.

TECHNICAL FIELD

The present disclosure relates to a vehicle lamp that uses an organic electro-luminescence (EL) element as a light source.

BACKGROUND

Using an organic EL element as a light source of a vehicle lamp has been recently reviewed. Unlike a light emitting diode (LED) that is similarly used as a light source, the organic EL element has a characteristic that a luminous flux maintenance factor largely decreases under a high temperature environment. This problem needs to be solved in order to prolong the lifetime of the organic EL element.

Japanese Patent Laid-Open Publication No. 2010-205714 discloses a method of suppressing the temperature rise of an organic EL element in a lighting device including the organic EL element by attaching a heat conductive film to the organic EL element.

SUMMARY

One aspect of the present disclosure is a vehicle lamp that includes a first light emission unit, and a second light emission unit including an organic EL element as a light source. The vehicle lamp is configured such that the second light emission unit is turned on at a tail lamp on time, and both the first light emission unit and the second light emission unit are turned on at a stop lamp on time. The vehicle lamp further includes a light reduction unit configured to make light intensity of the second light emission unit at the stop lamp on time smaller than that at the tail lamp on time.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 7 is a table illustrating an example of a light intensity ratio of the second light emission unit.

FIG. 8 is a table illustrating another example of the light intensity ratio of the second light emission unit.

DETAILED DESCRIPTION

Figure 1:
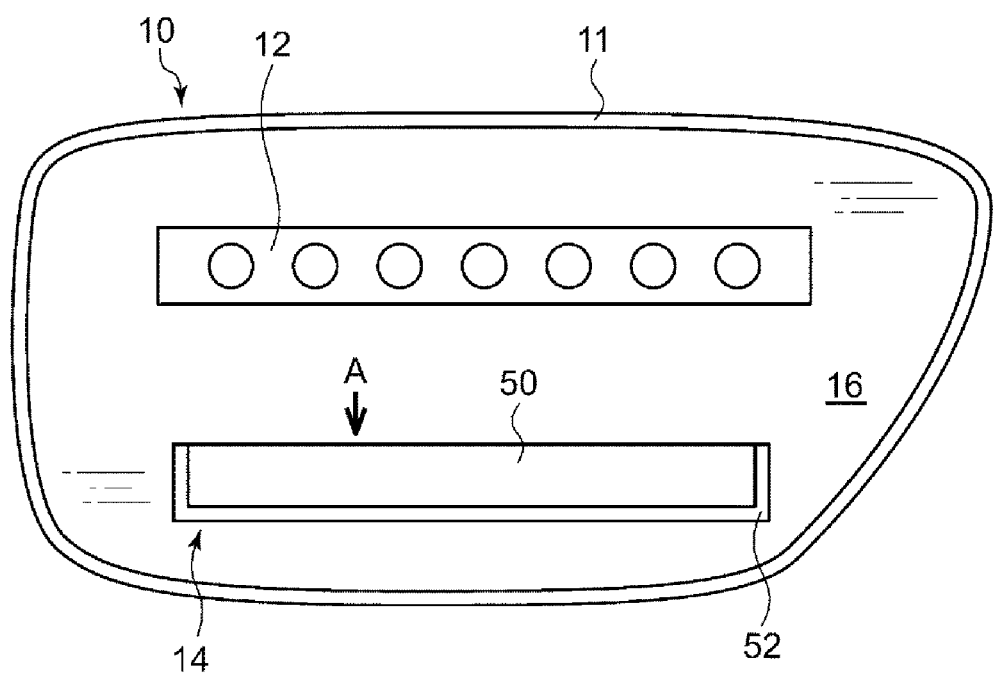
FIG. 1 is a schematic front view of a vehicle lamp according to an exemplary embodiment of the present disclosure.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Only with the technique described in Japanese Patent Laid-Open Publication No. 2010-205714, there is a limit in suppressing the heat generation of the organic EL element. Further, it is difficult to ensure a proper luminous flux maintenance factor for the light source of the vehicle lamp.

The present disclosure has been made in view of the circumstances described above, and an object thereof is to provide a technology of suppressing the decrease of a luminous flux maintenance factor of an organic EL element in a vehicle lamp that includes a light emission unit including, for example, a light emitting diode as a light source and a light emission unit including the organic EL element as a light source.

One aspect of the present disclosure is a vehicle lamp that includes a first light emission unit, and a second light emission unit including an organic EL element as a light source. The vehicle lamp is configured such that the second light emission unit is turned on at a tail lamp on time, and both the first light emission unit and the second light emission unit are turned on at a stop lamp on time. The vehicle lamp further includes a light reduction unit configured to make light intensity of the second light emission unit at the stop lamp on time than that at the tail lamp on time.

According to this aspect, the decrease of the luminous flux maintenance factor of the organic EL element of the second light emission unit may be suppressed so that prolongation of the lifetime of the organic EL element is achieved.

The light reduction unit may make the light intensity of the second light emission unit at the stop lamp on time become lower at night than in daytime. Accordingly, the luminous flux maintenance factor may be further increased.

The vehicle lamp may be configured such that, when the stop lamp is turned on, the light intensity required for the stop lamp is satisfied only by the first light emission unit, and the light emission area required for the stop lamp is satisfied by combining light emission ranges of the first light emission unit and the second light emission unit with each other. Accordingly, the specification (light intensity and light emission range) required for the stop lamp may always be satisfied, regardless how to reduce the light intensity of the second light emission unit.

The light reduction unit may limit a current flowing in the organic EL element when the temperature of the organic EL element is a predetermined value or more. Accordingly, by performing the light reduction of the second light emission unit when the temperature is high causing the large decrease of the luminous flux maintenance factor of the organic EL element, the decrease of the luminous flux maintenance factor may be suppressed.

The vehicle lamp may include a temperature estimation unit configured to measure the forward voltage of the organic EL element while the second light emission unit is turned on, and estimate the temperature of the organic EL element based on the measured value. Accordingly, it is not necessary to provide a thermometer in the vicinity of the organic EL element.

According to the present disclosure, in a vehicle lamp that includes the light emission unit including, for example, a light emitting diode, as a light source and the light emission unit including the organic EL element as a light source, the decrease of the luminous flux maintenance factor of the organic EL element may be suppressed.

FIG. 1 is a schematic front view of a vehicle lamp 10 according to an exemplary embodiment of the present disclosure. The vehicle lamp 10 is mounted on the left side of the rear end of a vehicle and has an identical structure to that of a lamp mounted on the right side, except that the lamps are bilaterally symmetrical to each other. Thus, hereinafter, detailed descriptions will be made on the left vehicle lamp 10, and descriptions of the left and right vehicle lamps will be omitted.

The vehicle lamp 10 includes a lamp body 11 having a recess that is opened forward. The opening is covered by a red transparent cover 16 so as to form a lamp chamber. A first light emission unit 12 and a second light emission unit 14 are accommodated within the lamp chamber in a state of being arranged one above the other.

The first light emission unit 12 includes one or more light emitting diodes as a light source. The first light emission unit 12 may be combined with an optical device that reflects or diffuses light generated from the light source such as, for example, a reflector, a light guide, or a convex lens, or may be configured only by one or more light emitting diodes. Although FIG. 1 illustrates the first light emission unit 12 including a rectangular light guide, the position and the shape of the first light emission unit 12 within the lamp chamber are not limited. Further, the first light emission unit 12 may use other light sources such as, for example, semiconductor lasers and halogen bulbs.

The second light emission unit 14 includes a planar light emitter 50 including an organic EL panel, and a bracket 52 configured to fix the planar light emitter 50 within the lamp chamber. In FIG. 1, the rectangular planar light emitter 50 is disposed below the first light emission unit 12. However, the position and the shape of the planar light emitter 50 are not limited as long as the planar light emitter 50 is disposed around the first light emission unit 12. For example, the planar light emitter 50 may be disposed above or at the left or right side of the first light emission unit 12. Or, the planar light emitter 50 may be in a shape that surrounds the first light emission unit 12.

While the opposite sides of the organic EL panel are configured by glass substrates, the bracket 52 is usually formed of a resin material. The thermal expansion coefficients of the organic EL panel and the bracket 52 are largely different from each other. Hence, when the planar light emitter including the organic EL panel is attached to the vehicle lamp, it is required to take the length change of the planar light emitter, which is influenced by the difference in thermal expansion coefficient, into consideration. Conventionally, in many cases, a buffer such as, for example, a packing was inserted between the bracket and the planar light emitter or the attachment was conducted using a double-sided tape. However, these fixing methods cause a cost increase, and the assembly workability is also poor. Further, since the packing often contains a sulfur component, it may affect the electronic parts of the vehicle lamp or cloud the cover of the lamp.

Figure 2A:
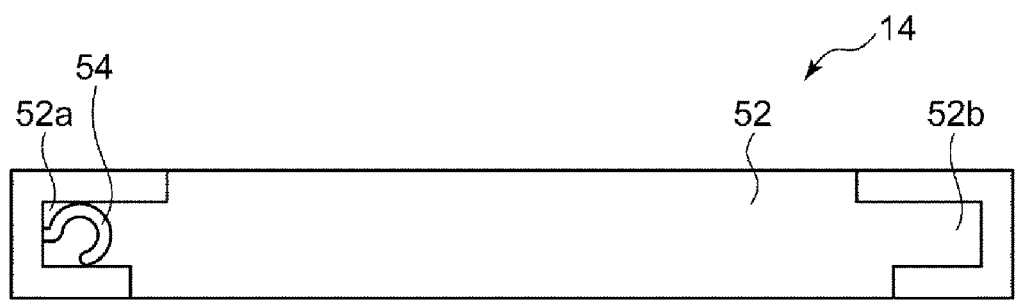
FIGS. 2A and 2B are schematic views illustrating a method of fixing a planar light emitter to a bracket.

FIG. 2A is a view illustrating the bracket 52, which is installed within the lamp chamber of the vehicle lamp 10 according to the present exemplary embodiment and configured to fix the planar light emitter 50, when viewed from the top side thereof (in the direction of arrow A in FIG. 1). As illustrated, the bracket 52 includes a left recess-shaped portion 52a and a right recess-shaped portion 52b that are formed at the left and right edges of the bracket 52, respectively. The left recess-shaped portion 52a and the right recess-shaped portion 52b are arranged such that the bottom surfaces thereof face each other. The distance between the bottom surfaces is slightly longer than the horizontal width of the planar light emitter 50. An elastic contact unit 54 is provided at one or a plurality of points inside the left recess-shaped portion 52a. The elastic contact unit 54 is, for example, a metal formed in a spring shape. However, the elastic contact unit 54 may be formed of another elastic material such as, for example, rubber or a packing. Further, the elastic contact unit 54 may be disposed inside the right recess-shaped portion 52b.

Figure 2B:
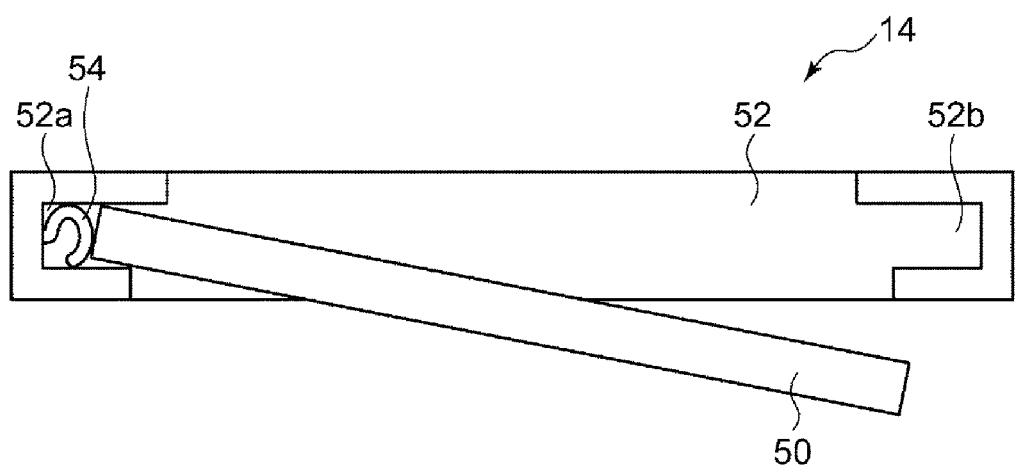

FIG. 2B is a view illustrating a method of assembling the planar light emitter 50 to the bracket 52. First, the left end of the planar light emitter 50 is inserted into the inside of the left recess-shaped portion 52a. At this time, the left end of the planar light emitter 50 presses and crushes the elastic contact unit 54 provided inside the left recess-shaped portion 52a. Accordingly, the left end of the planar light emitter 50 is pushed into the inside of the left recess-shaped portion 52a such that the right end of the planar light emitter 50 is able to be inserted into the inside of the right recess-shaped portion 52b.

As described above, the planar light emitter may be fixed by using the elastic contact unit provided inside the bracket, without using a buffer such as, for example, a packing or a double-sided tape. Therefore, costs are reduced, and the assembly workability is also improved. Further, since no packing is used, no sulfur gas is generated. The length change resulting from the difference in thermal expansion coefficient between the bracket and the planar light emitter may be absorbed by the elongation and the contraction of the elastic contact unit. Further, the planar light emitter is biased and held by the elastic contact unit so that the influence of the vibration or shock of the vehicle may be alleviated.

Unlike the light emitting diode, the organic EL panel exhibits the large decrease of the luminous flux maintenance factor at a high temperature. Further, a trouble such as, for example, non-lighting may also occur when the temperature of the organic EL panel exceeds a glass transition temperature. Further, there is also a problem in that luminance non-uniformity may be caused when the temperature of the organic EL panel is not uniform. Hence, uniformizing the temperature of the organic EL panel is important for ensuring the long lifetime and the high reliability of the organic EL panel.

Figure 3:
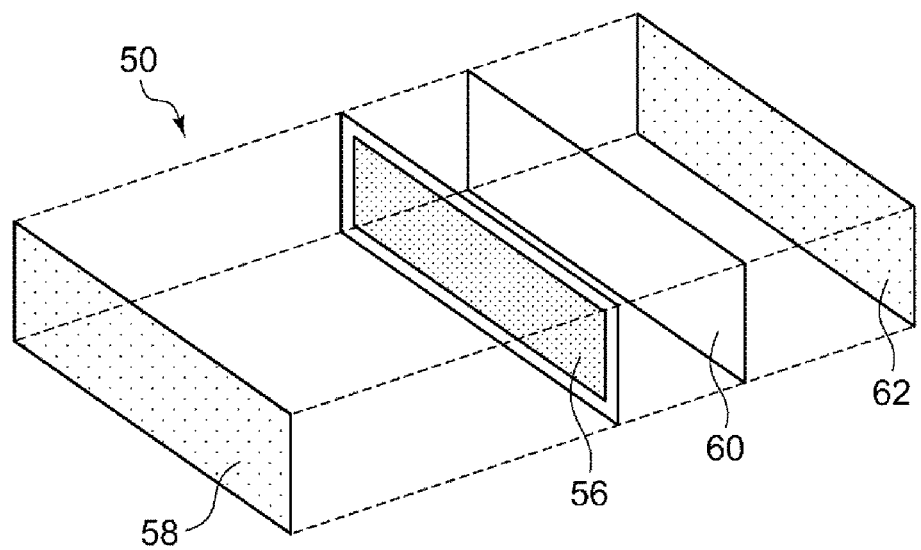
FIG. 3 is an exploded perspective view illustrating a structure of the planar light emitter.

FIG. 3 is an exploded perspective view illustrating a structure of the planar light emitter 5. The planar light emitter 50 includes an organic EL panel 56 and a mounting rear panel 62. In the example of FIG. 3, the organic EL panel 56 emits light from one surface. A highly heat-conductive transparent film 58 is attached to the light emitting side of the organic EL panel 56, i.e., the cover 16 side of the vehicle lamp. Further, the rear side of the organic EL panel 56 and the rear panel 62 are attached to each other by a highly heat-conductive double-sided tape 60.

Generally, the heat conductivity of the glass substrates of both the sides of the organic EL panel 56 is 0.55 W/mK to 0.75 W/mK. Accordingly, the highly heat-conductive transparent film 58 may have the heat conductivity of 1 W/mK or more and may be formed of, for example, carbon graphite, carbon nanotubes, and graphene. The highly heat-conductive double-sided tape 60 may also have the heat conductivity of 1 W/mK or more, and may be obtained by incorporating a filler having a high heat conductivity (e.g., graphite, copper, or silicon carbide) in a resin material (e.g., acryl, polycarbonate, or polystyrene).

In the example of FIG. 3, the organic EL panel 56 emits light from one side. However, when, for example, a mirror is placed at the rear side of the organic EL panel to exhibit a mirror tunnel using reflected light, an organic EL panel, which emits light from the opposite sides and is transparent, may be used.

Figure 4:
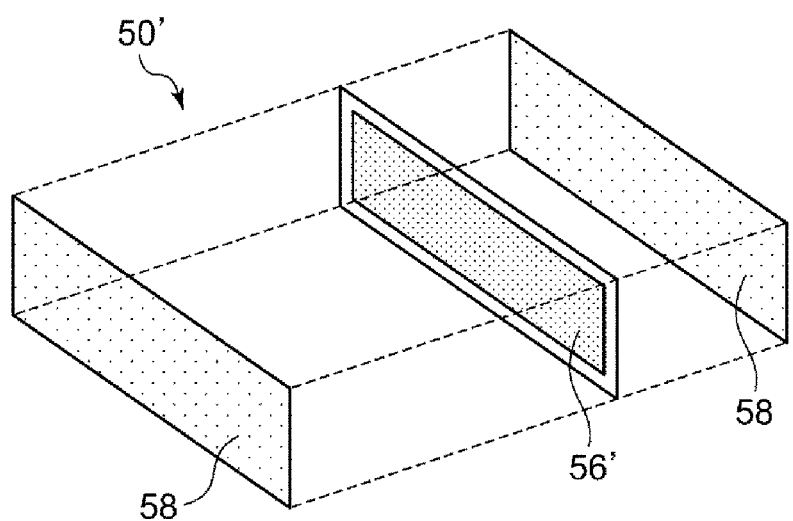
FIG. 4 is an exploded perspective view illustrating a structure of another planar light emitter.

FIG. 4 is an exploded perspective view illustrating a structure of a planar light emitter 50' used in the above-described case. In the planar light emitter 50', a highly heat-conductive transparent film 58 is attached to each of the opposite sides of the organic EL panel 56'.

As illustrated in FIGS. 3 and 4, by attaching the highly heat-conductive transparent film or the double-sided tape to each of the opposite sides of the organic EL panel, the heat uniformity of the organic EL panel may be achieved so that the luminance non-uniformity is reduced. Further, heat conduction to the atmosphere through the transparent film or heat conduction to the rear panel through the double-sided tape is facilitated so that the heat radiation property of the organic EL panel itself is also improved. Therefore, the lifetime of the organic EL panel is prolonged.

Figure 5A:
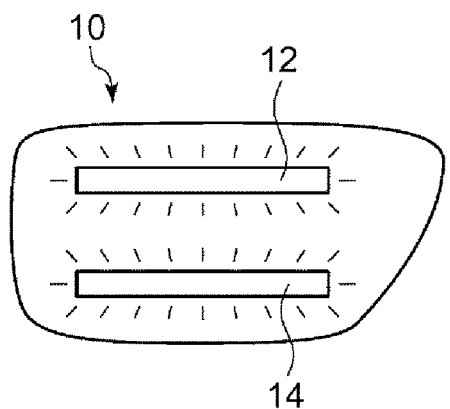
FIGS. 5A and 5B are views illustrating the turned-on states of a first light emission unit and a second light emission unit at a stop lamp on time and at a tail lamp on time, respectively.
Figure 5B:
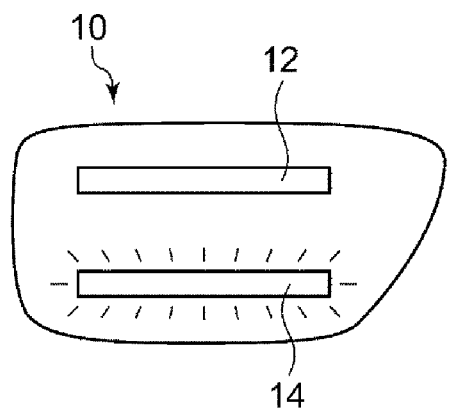

Returning to FIG. 1, the vehicle lamp 10 has the functions of both the stop lamp and the tail lamp. When a driver of the vehicle steps on the brake pedal, namely, in response to a stop lamp on signal, both the first light emission unit 12 and the second light emission unit 14 are turned on (see, e.g., FIG. 5A). When the driver of the vehicle turns on a tail lamp switch, only the second light emission unit 14 is turned on in response to the tail lamp on signal (see, e.g., FIG. 5B).

The first light emission unit 12 is configured such that, when the stop lamp is turned on, the light intensity required for the stop lamp is satisfied only by the first light emission unit 12. Further, the first light emission unit 12 is configured such that the light emission area required for the stop lamp is satisfied by combining the light emission ranges of the first light emission unit 12 and the second light emission unit 14 with each other. The second light emission unit 14 is configured such that the second light emission unit 14 alone satisfies the light intensity required for the tail lamp. With this configuration, the specification (light intensity and light emission range) required for the stop lamp may always be satisfied, regardless of the light intensity of the second light emission unit 14.

As described above, the organic EL panel exhibits the large decrease of the luminous flux maintenance factor at a high temperature, and the trouble of non-lighting occurs when the temperature of the organic EL panel exceeds a glass transition temperature. Accordingly, the second light emission unit 14 using the organic EL panel may be controlled not to reach a high temperature if possible. Hereinafter, a controller 100 configured to perform such a control will be described.

Figure 6:
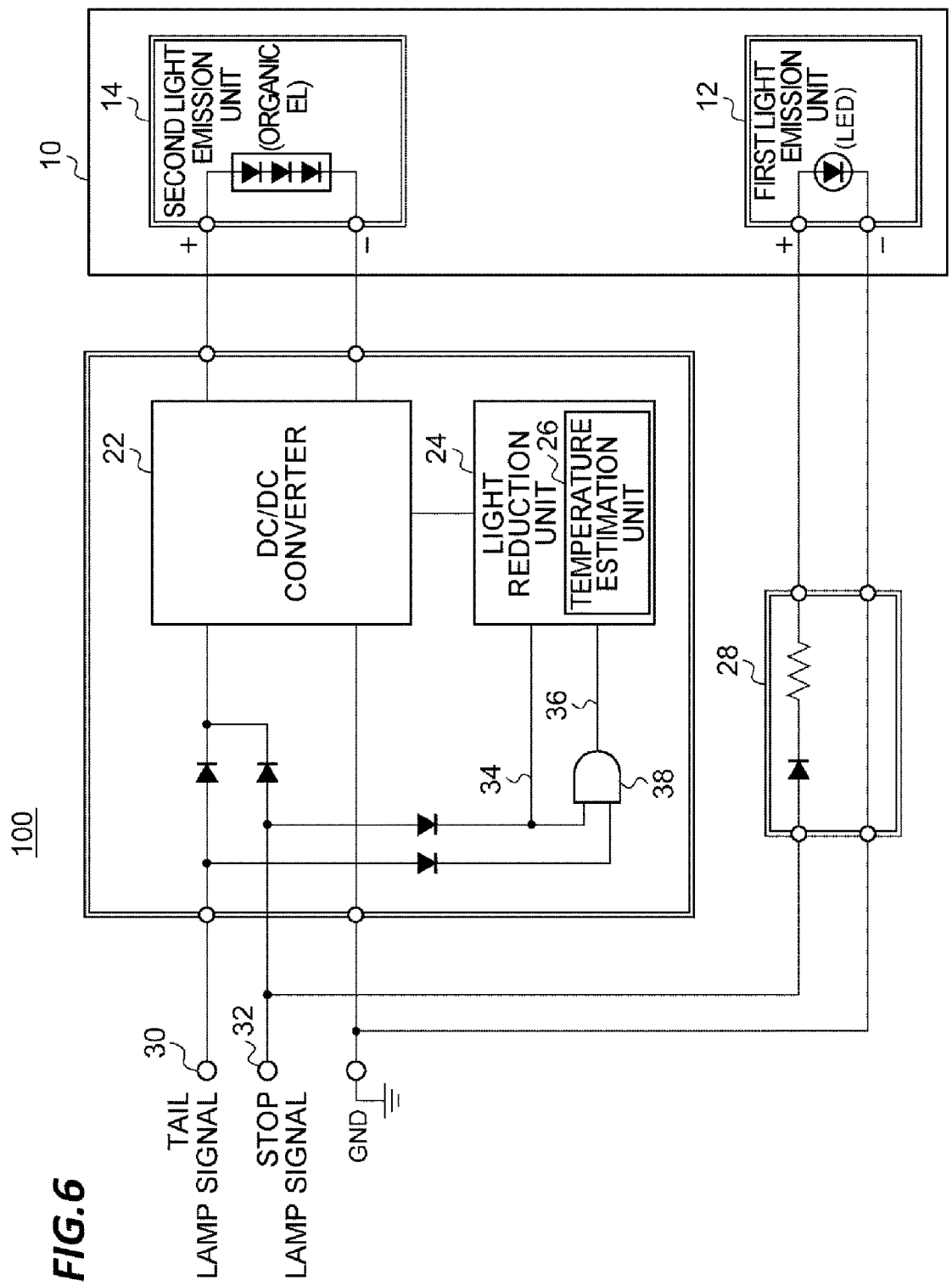
FIG. 6 is a schematic circuit diagram of a controller of the vehicle lamp.

FIG. 6 is a schematic circuit diagram of the controller 100 of the vehicle lamp 10. When the driver of the vehicle turns on the tail lamp switch, a tail lamp input voltage 30 is applied, and the organic EL panel of the second light emission unit 14 is turned on through a DC/DC converter.

When the driver of the vehicle steps on the brake pedal, a stop lamp input voltage 32 is applied, and the LED of the first light emission unit 12 is turned on through a resistance circuit 28. At the same time, the organic EL panel of the second light emission unit 14 is turned on through the DC/DC converter 22.

The stop lamp input voltage 32 is also input to the light reduction unit 24 (input 34). When the stop lamp input voltage 32 is applied while the tail lamp is turned on, the stop lamp input voltage 32 is input to the light reduction unit 24 through an AND circuit 38 (input 36). In general, the tail lamp is turned on only at night. Hence, the input 34 may be regarded as a stop lamp input in daytime, and the input 36 may be regarded as a stop lamp input at night.

The light reduction unit 24 is configured to make the light intensity of the second light emission unit 14 at the stop lamp on time lower than that at the tail lamp on time. As described above, the vehicle lamp 10 is configured such that the light intensity required for the stop lamp is satisfied only by the first light emission unit 12. The light intensity of the second light emission unit 14 may be reduced as long as the light emission area of the stop lamp is satisfied (in other words, the stop lamp may be visually recognized). Hence, by making the light intensity of the second light emission unit 14 at the stop lamp on time become lower than that at the tail lamp on time, the heat generation of the organic EL panel of the second light emission unit may be suppressed thereby achieving the prolongation of the lifetime of the organic EL panel.

More specifically, to what degree the light intensity of the second light emission unit 14 should be reduced may be determined through verification by an actual apparatus or a simulation. Hereinafter, an example will be described.

FIG. 7 represents to what degree of light intensity the second light emission unit should be turned on when the stop lamp signal is on, assuming that the light intensity of the second light emission unit is 100% when the tail lamp alone is turned on. When the stop lamp is on, the first light emission unit is turned on. Accordingly, it was confirmed that in daytime when the tail lamp is not turned on, it may be visually recognized that the second light emission unit is turned on even if the light intensity of the second light emission unit is reduced to 20%. At night when the tail lamp is turned on, it may be visually recognized that the second light emission unit is turned on even if the light intensity of the second light emission unit is reduced to 10% when the stop lamp signal is on. However, when the light intensity of the second light emission unit is largely reduced and the first light emission unit is turned on when the stop lamp signal is on, it feels unnatural to a viewer of the vehicle lamp. In this case, it was confirmed that the viewer is not aware of the reduction of the light intensity of the second light emission unit even if the light intensity of the second light emission unit is set to about 55% so that the light intensity of the second light emission unit is reduced while the first light emission unit is turned on.

When the temperature of the organic EL panel of the second light emission unit is high, the organic EL panel may be protected by reducing the light intensity to become lower than the example of FIG. 7. FIG. 8 represents to what degree of light intensity the second light emission unit should be turned on when the stop lamp signal is on in the case where the temperature of the organic EL panel is high. When the temperature is high, in the case where the tail lamp alone is turned on, the light intensity of the second light emission unit is reduced so that the light intensity ratio of the second light emission unit is in a range of 50% to 100%. In this way, the temperature of the organic EL panel may be suppressed from further increasing.

The light reduction unit 24 may determine whether the temperature of the organic EL panel is high through a temperature sensor installed near the organic EL panel. Alternatively, the light reduction unit 24 may be provided with a temperature estimation unit 26 configured to estimate the temperature of the organic EL panel based on the voltage applied to the organic EL panel.

Figures 9, 10:
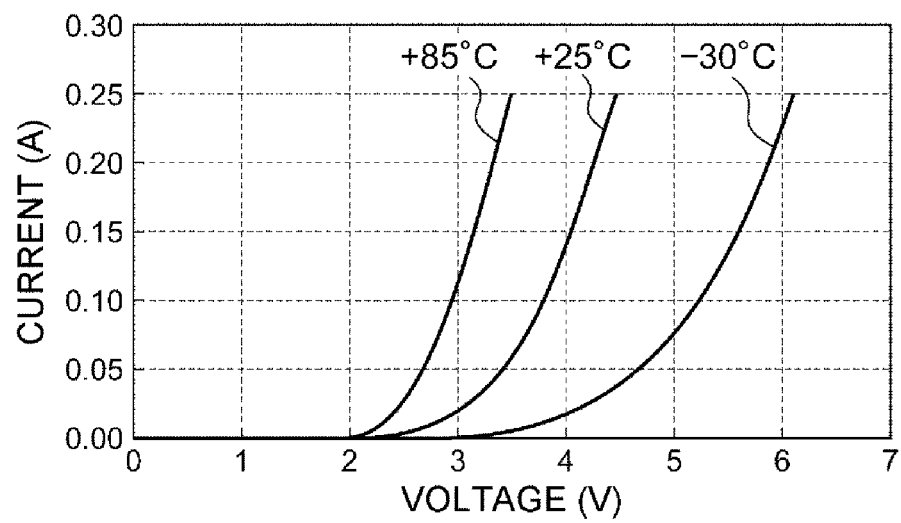
FIG. 9 is a graph illustrating a relationship between a forward voltage and an atmospheric temperature of an organic EL element.
FIG. 10 is a table illustrating the correspondence between an estimated temperature and a light intensity ratio of an organic EL panel.

In general, the organic EL element is characterized in that its forward voltage varies depending on its atmospheric temperature. For example, as illustrated in FIG. 9, it may be understood that when the atmospheric temperature of the organic EL element is 85° C., 25° C., or −30° C., the forward voltage largely changes. Thus, the temperature estimation unit 26 measures the forward voltage of the organic EL panel when a rated current flows in the second light emission unit 14. Then, the temperature estimation unit 26 estimates the temperature of the organic EL panel with reference to a prerecorded map.

Based on the estimated temperature of the organic EL panel, the light reduction unit 24 reduces the light intensity of the second light emission unit 14 by limiting the current flowing in the organic EL panel. FIG. 10 is a table representing an example in this regard. When the estimated temperature of the organic EL panel is 50° C. or less, the light intensity ratio remains 100%. When the estimated temperature of the organic EL panel is within a range of 50° C. to 60° C., the light reduction unit 24 limits the current flowing in the organic EL panel until the light intensity ratio becomes 83%. When the estimated temperature of the organic EL panel is within a range of 60° C. to 70° C., the light reduction unit 24 limits the current flowing in the organic EL panel until the light intensity ratio becomes 67%. When the estimated temperature is 70° C. or more, the light reduction unit 24 limits the current flowing in the organic EL panel until the light intensity ratio becomes 50%.

Further, when the estimated temperature of the organic EL panel is a predetermined value or more, the light reduction unit 24 may limit the current flowing in the organic EL panel such that the light intensity ratio becomes constant.

Figure 11:
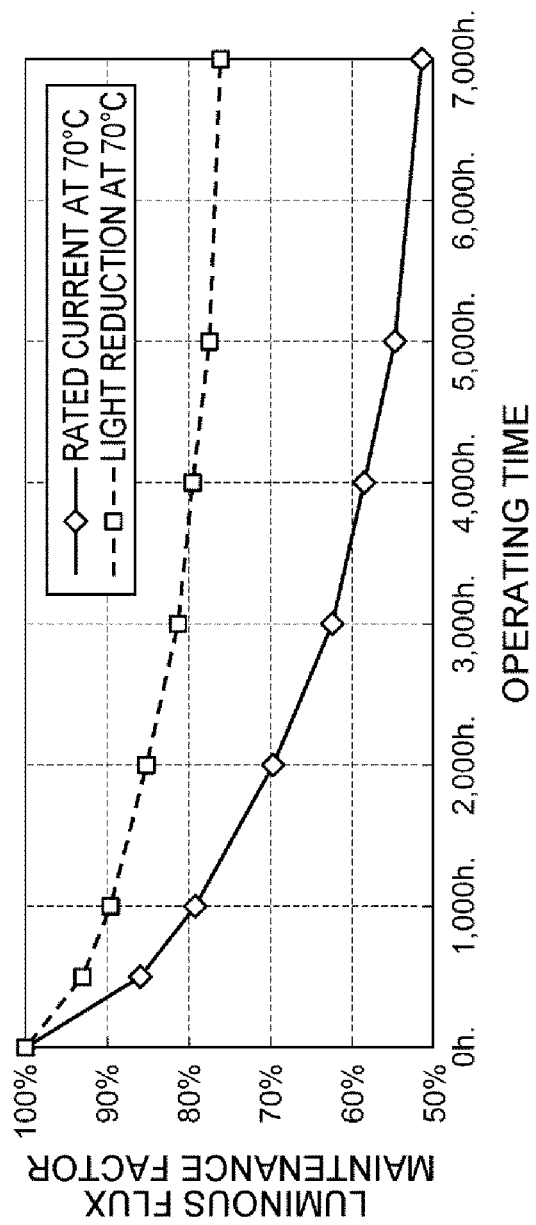
FIG. 11 is a graph illustrating a relationship between an operation time and a luminous flux maintenance factor of the organic EL panel.

FIG. 11 is a graph that compares, when the temperature of the organic EL panel of the second light emission unit 14 is 70° C., luminous flux maintenance factors between the case where the light intensity ratio of 100% is maintained and the case where the light intensity ratio is reduced to 50%. The horizontal axis represents the operating time of the organic EL panel. The vertical axis represents the luminous flux maintenance factor. As it is clear from FIG. 11, it may be understood that the luminous flux maintenance factor decreases to 50% of the origin when the light intensity ratio of 100% is maintained, whereas the light intensity ratio may be maintained at 70% or more when the light intensity ratio decreases to 50%.

As described above, according to the present exemplary embodiment, in a vehicle lamp that includes a first light emission unit using, for example, a light emitting diode as a light source and a second light emission unit using an organic EL element as a light source, the light intensity of the second light emission unit is made to be lower than that when the second light emission unit is turned on as the tail lamp when the second light emission unit is used as a part of the stop lamp. Therefore, the decrease of the luminous flux maintenance factor of the organic EL element of the second light emission unit may be suppressed so that the prolongation of the lifetime of the organic EL element is achieved.

The light intensity ratio of the second light emission unit as described above is merely an example and properly set depending on various conditions such as, for example, the luminance of the light emitting element of each of the first and second light emission units, the number of lamps, a positional relationship, a required lifetime, and the cooling efficiency of a vehicle lamp. The present disclosure includes, in its scope, a vehicle lamp that is controlled to lower the light intensity ratio of the second light emission unit at the stop lamp on time than at the tail lamp on time.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicle lamp comprising:
   a first light emission unit;
   a second light emission unit including an organic EL element as a light source; and
   a controller including a light reduction unit and configured to control the first light emission unit and the second light emission unit such that the second light emission unit is turned ON at a time when a tail lamp is turned ON, and both the first light emission unit and the second light emission unit are turned ON at a time when a stop lamp is turned ON,
   wherein
   the light reduction unit is configured to control the first light emission unit and the second light emission unit such that light intensity of the second light emission unit at the time when the stop lamp is turned ON becomes lower than that at the time when the tail lamp is turned ON.

2. The vehicle lamp of claim 1, wherein the light reduction unit makes the light intensity of the second light emission unit at the time when the stop lamp is turned ON becomes lower at night than in daytime.

3. The vehicle lamp of claim 1, wherein, when the stop lamp is turned ON, the light intensity required for the stop lamp is satisfied only by the first light emission unit, and a light emission area required for the stop lamp is satisfied by combining light emission ranges of the first light emission unit and the second light emission unit with each other.

4. The vehicle lamp of claim 1, wherein the light reduction unit limits a current flowing in the organic EL element when a temperature of the organic EL element is a predetermined value or more.

5. The vehicle lamp of claim 4, further comprising:
   a temperature estimation unit configured to measure a forward voltage of the organic EL element while the second light emission unit is turned ON, and estimate the temperature of the organic EL element based on a value obtained from the measurement.

6. The vehicle lamp of claim 1, wherein the second light emission unit includes:

a planar light emitter including the organic EL element; and a bracket configured to fix the planar light emitter within the vehicle lamp.

7. The vehicle lamp of claim 6, wherein the bracket includes a left recess-shaped portion and a right recess-shaped portion that are formed at left and right edges of the bracket, respectively, and the left recess-shaped portion and the right recess-shaped portion are arranged such that bottom surfaces thereof face each other, and a distance between the bottom surfaces is longer than a horizontal width of the planar light emitter.

8. The vehicle lamp of claim 7, wherein an elastic contact unit is provided at one or a plurality of points inside one of the left recess-shaped portion and the right recess-shaped portion.

9. The vehicle lamp of claim 8, wherein the elastic contact unit is a metal formed in a spring shape.

10. The vehicle lamp of claim 8, wherein the elastic contact unit is formed of an elastic material including rubber or a packing.

\* \* \* \* \*